(12) United States Patent
Moyaux et al.

(10) Patent No.: US 7,945,583 B2
(45) Date of Patent: *May 17, 2011

(54) TECHNIQUE FOR DATA MINING USING A WEB SERVICE

(75) Inventors: Yan Moyaux, Woodbury, CT (US); Charles J Schott, Danbury, CT (US); David A Selby, North Boarhunt Nr Fareham (GB); Vince P Thomas, Severna Park, MD (US)

(73) Assignee: International Business Machines Corporation, Armonk, NY (US)

( * ) Notice: Subject to any disclaimer, the term of this patent is extended or adjusted under 35 U.S.C. 154(b) by 535 days.

This patent is subject to a terminal disclaimer.

(21) Appl. No.: 11/763,634

(22) Filed: Jun. 15, 2007

(65) Prior Publication Data

US 2007/0244909 A1    Oct. 18, 2007

Related U.S. Application Data

(63) Continuation of application No. 10/956,579, filed on Oct. 1, 2004, now Pat. No. 7,657,535.

(51) Int. Cl.
*G06F 17/30* (2006.01)

(52) U.S. Cl. .................................................. 707/776
(58) Field of Classification Search .................. None
See application file for complete search history.

(56) References Cited

U.S. PATENT DOCUMENTS 6,836,773 B2 * 12/2004 Tamayo et al. .................. 707/6
7,032,005 B2 *  4/2006 Mathon et al. ............... 709/206

* cited by examiner

*Primary Examiner* — Wilson Lee
*Assistant Examiner* — Belinda Xue
(74) *Attorney, Agent, or Firm* — Saul Ewing LLP; John R. Pivnichny

(57) ABSTRACT

A technique for the deployment of data mining algorithms on a web service, such as IBM's WebSphere Application Server, is disclosed. Rather than having to deploy the data mining models with the data, the data can be transported to the web server as part of a message. Models can be cached on the web server and easily changed by operations executed by the client. This allows for efficient administration of the operational environment. Because a web services environment is inherently scalable, servers can be transparently enabled based on demand. Further, with web services communication is via data objects in memory which allows for ease of implementation and operational efficiency.

16 Claims, 5 Drawing Sheets

TECHNIQUE FOR DATA MINING USING A WEB SERVICE

CROSS-REFERENCE TO RELATED APPLICATIONS

This is a continuation of U.S. application Ser. No. 10/956,579, filed Oct. 1, 2004.

BACKGROUND OF THE INVENTION

1. Field of the Invention

The present invention relates to a technique for executing data mining algorithms whereby the algorithms are provided as a web service.

2. Description of the Related Art

Data and information pervades every aspect of our lives today. With vast improvements in processing power, access to the Internet, and other similar advancements, there has never been a time where more information and data is available for use by consumers, businesses, marketers, pollsters, and any other entity that might find it useful to analyze data.

Using customer information as an example, even before the computer revolution, customer information and lists and the like have long been recognized as extremely valuable corporate assets. Relatively recently, data mining was introduced as a technique that can intelligently and automatically transform data into information. Data mining is the search for relationships and global patterns that exist in large or small databases, but are hidden among vast amounts of data. Data mining extracts previously unknown, and potentially useful information (e.g., rules, constraints, correlations, patterns, signatures and any irregularities), focusing on automated methods for extracting patterns and/or models from data.

The data mining community has focused mainly on automated methods for extracting patterns and/or models from data. The state-of-the-art in automated methods of data mining is still in a fairly early stage of development, although progress in this area is certainly being made.

The primary goals of data mining in practice are prediction and description. Prediction involves using some variables or fields in the database to predict unknown or future values of other variables of interest. Description focuses on finding interpretable patterns that describe the data. The relative importance of prediction and description for particular data mining applications can vary considerably. For example, in business, a successful data mining method is known as "Market Basket Research." Market Basket Research analyzes customer transactions for patterns or "association rules" which help make business decisions (e.g., chose sale items, design coupons, arrange shelves, etc.); this is also known as association rules mining. Data mining finds application in many other fields as well. One area in which data mining is frequently used is in the detection of fraud. Insurance companies, tax authorities, investment regulators, and the like will frequently mine data related to their field to identify persons and/or organizations that may be committing fraudulent acts.

For example, data mining can be performed by a tax authority relative to the individuals or companies falling under its jurisdiction to determine, based upon taxpayer data, which taxpayers are most likely to be committing fraudulent acts, and then focus their investigative energy and resources on those taxpayers.

In data mining, an algorithm is often created that defines the desired mining. In practice, this algorithm can be quite complex. Commonly, the algorithm goes through each customer or entity record and creates a score relative to each entity, which is utilized to determine whether to investigate the taxpayer, market a product to a customer, stop payment of a health insurance claim or investigate a clinic for services not rendered.

Typically the data mining algorithm is embodied in an application which is external to the database. One data mining product which adopts this method is the Intelligent Miner® product from International Business Machines (IBM). The external application "scores" the database from an existing model. These applications utilize an SQL cursor and fetches each record or tuple to be scored sequentially. One example of a highly efficient technique for data mining large scale relational databases using SQL is described in U.S. Pat. No. 6,484,163, incorporated herein fully by reference.

These known methods, while functioning very well with a database, require that the model be deployed inside a database. This is limited, as it is only accessible to those having access to the database in such a way that the model can be deployed therein. Further, computer resources in a database environment are finite, and the database environment is constrained by many communications protocols. Accordingly, it would be desirable to have a technique for executing data mining models as a web service, so variable demand can be accommodated and so the data mining process can be decoupled from the database.

SUMMARY OF THE INVENTION

The present invention is the deployment of data mining algorithms on a web service, such as IBM's WebSphere Application Server. Rather than having to deploy the data mining models with the data, using the present invention, the data can be transported to the web server as part of a message. Models can be cached on the web server and easily changed by operations executed by the client. This allows for efficient administration of the operational environment. Because a web services environment is inherently scalable, servers can be transparently enabled based on demand. Further, with web services communication is via data objects in memory which allows for ease of implementation and operational efficiency.

The present invention will now be described with reference to the following drawings, in which like reference numbers denote the same element throughout.

DETAILED DESCRIPTION OF THE PREFERRED EMBODIMENTS

Figure 1:
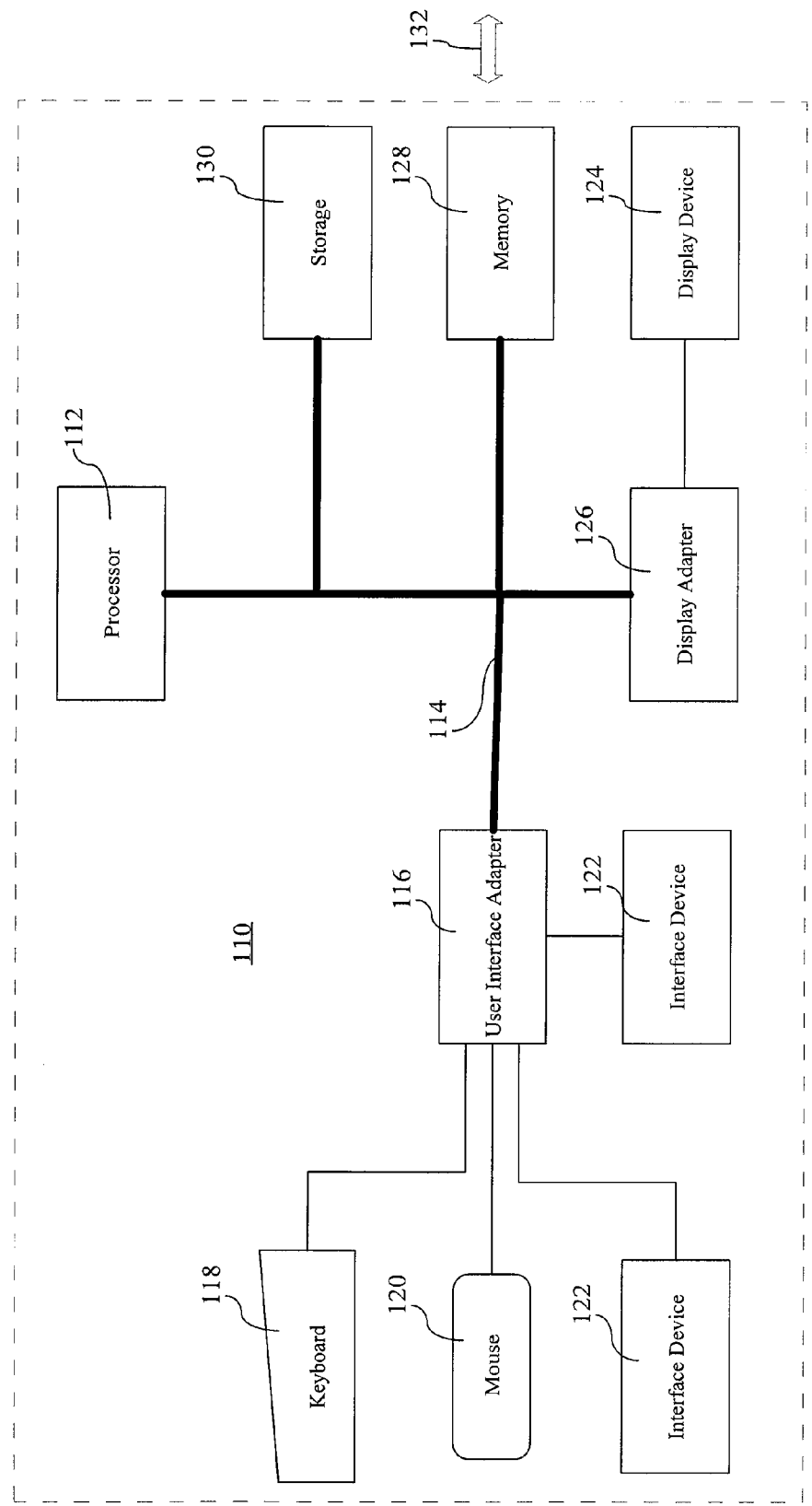
FIG. 1 is a pictorial representation of a data processing system which may be utilized to implement the present invention.

FIG. 1 illustrates a representative workstation hardware environment in which the present invention may be practiced. The environment of FIG. 1 comprises a representative single user computer workstation 110, such as a personal computer, including related peripheral devices. The workstation 110 includes a microprocessor 112 and a bus 114 employed to connect and enable communication between the microprocessor 112 and the components of the workstation 110 in accordance with known techniques. The workstation 110 typically includes a user interface adapter 116, which connects the microprocessor 112 via the bus 114 to one or more interface devices, such as keyboard 118, mouse 120, and/or other interface devices 122, which can be any user interface device, such as a touch sensitive screen, digitized entry pad, etc. The bus 114 also connects a display device 124, such as an LCD screen or monitor, to the microprocessor 112 via a display adapter 126. The bus 114 also connects the microprocessor 112 to memory 128 and long term storage 130 which can include a hard drive, tape drive, etc.

The workstation 110 communicates via a communications channel 132 with other computers or networks of computers. The workstation 110 may be associated with such other computers in a local area network (LAN) or a wide area network, or the workstation 110 can be client in a client/server arrangement with another computer, etc. All of these configurations, as well as the appropriate communications hardware and software, are known in the art.

Figure 2:
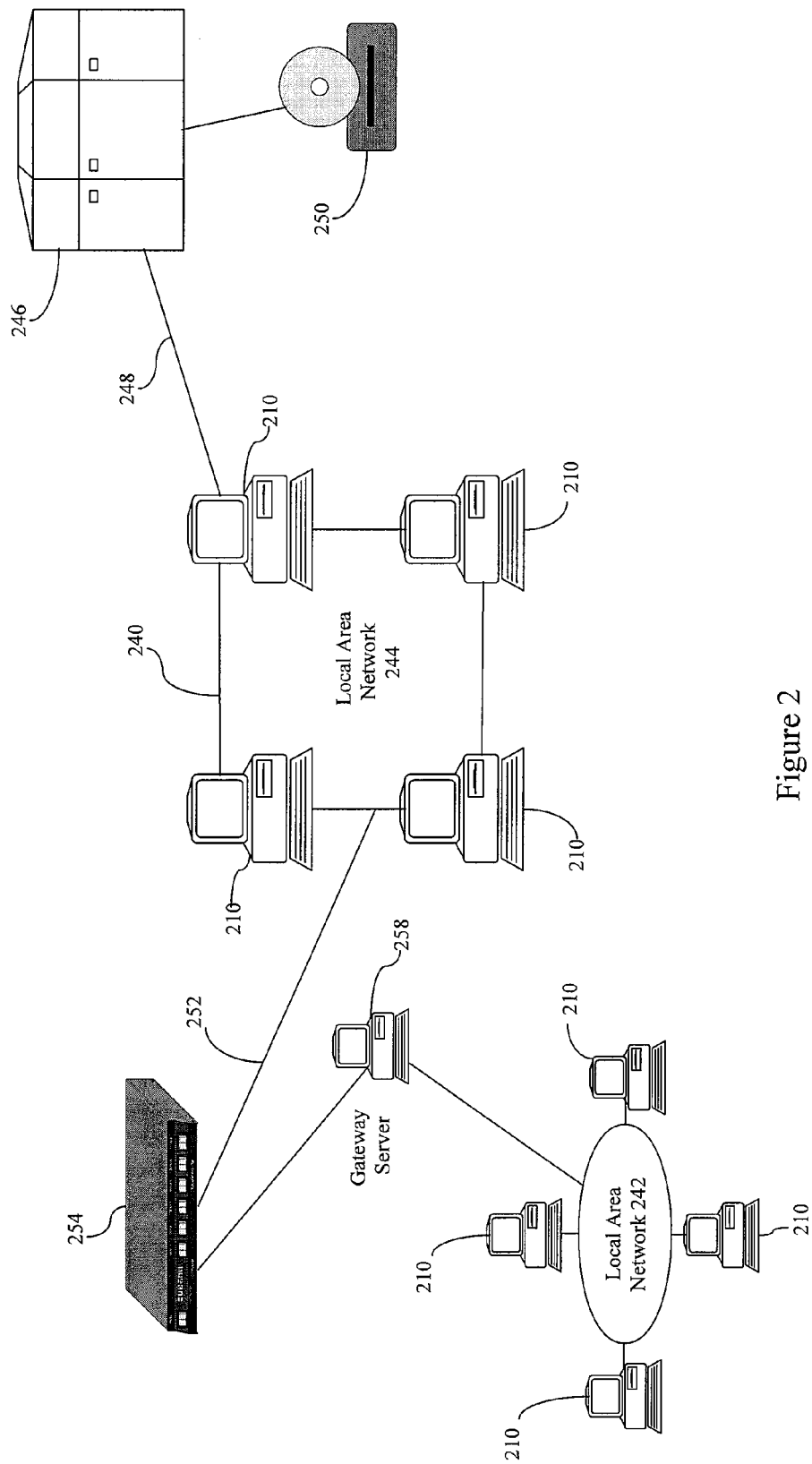
FIG. 2 is a diagram of a network computing environment in which the present invention may be practiced.

FIG. 2 illustrates a data processing network 240 in which the present invention may be practiced. The data processing network 240 includes a plurality of individual networks, including LANs 242 and 244, each of which includes a plurality of individual workstations 210. Alternatively, as those skilled in the art will appreciate, a LAN may comprise a plurality of intelligent workstations coupled to a host processor.

Still referring to FIG. 2, the data processing network 240 may also include multiple mainframe computers, such as a mainframe computer 246, which may be preferably coupled to the LAN 244 by means of a communications link 248. The mainframe computer 246 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 246 may also be coupled to a storage device 250, which may serve as remote storage for the LAN 244. Similarly, the LAN 244 may be coupled to a communications link 252 through a subsystem control unit/communication controller 254 and a communications link 256 to a gateway server 258. The gateway server 258 is preferably an individual computer or intelligent workstation which serves to link the LAN 242 to the LAN 244.

Those skilled in the art will appreciate that the mainframe computer 246 may be located a great geographic distance from the LAN 244, and similarly, the LAN 244 may be located a substantial distance from the LAN 242. For example, the LAN 242 may be located in California, while the LAN 244 may be located in Texas, and the mainframe computer 246 may be located in New York.

Software programming code which embodies the present invention is typically stored in permanent storage of some type, such as the permanent storage 230 of the workstation 210. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Figure 3:
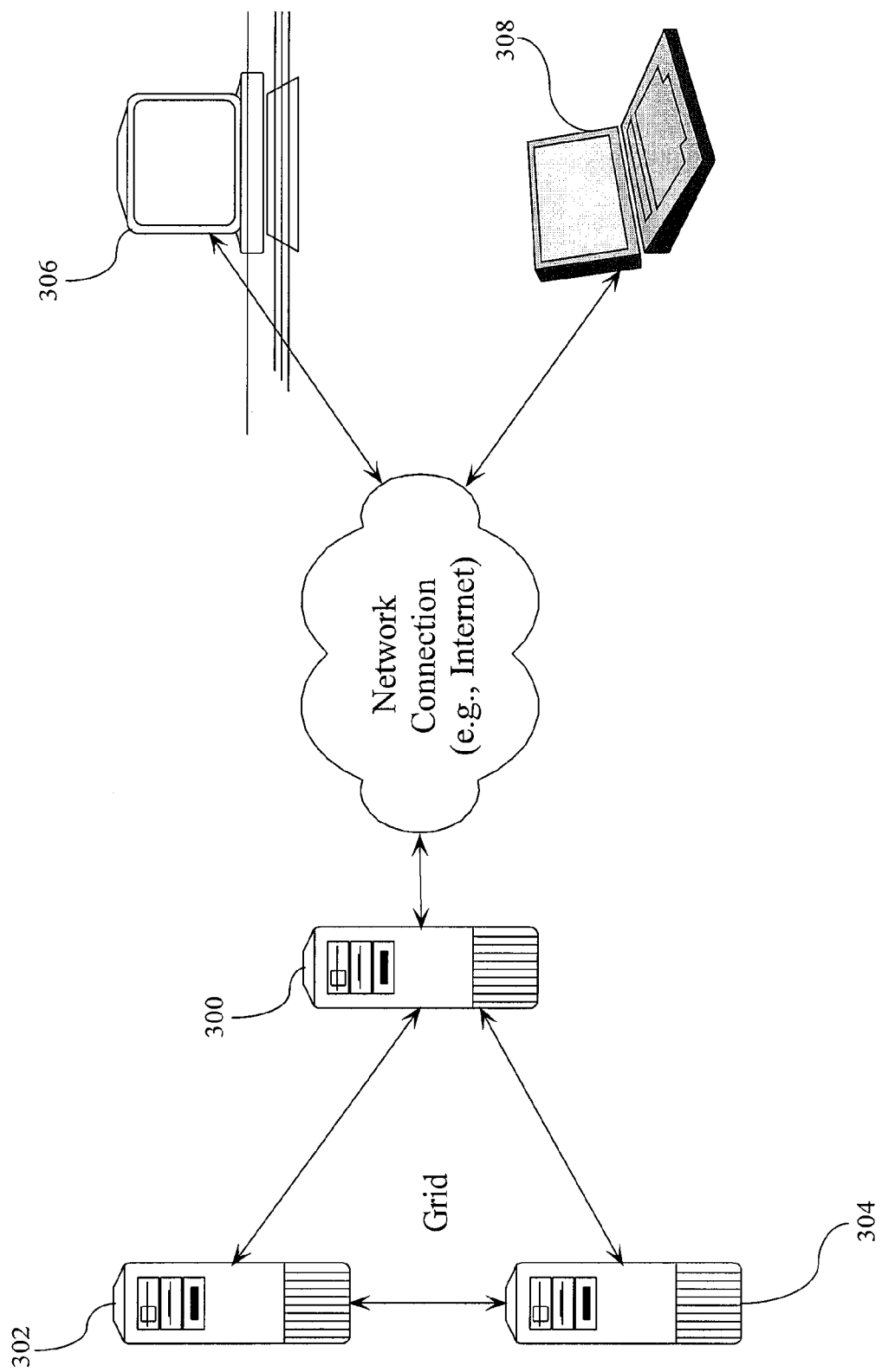
FIG. 3 is a diagram of a web server system in which the present invention may be implemented.

The preferred embodiment of the present invention will now be discussed with reference to FIGS. 3-5. FIG. 3 is a web server environment in which the present invention is effective. A web service is made available for use via a web server 300. Web server 300 also provides a location for storage of one or more data mining algorithms to be used by client systems accessing the web service. As is well known, the web server 300 can be coupled to a grid network (illustrated in FIG. 3 as the interconnection between web server 300 and servers 302 and 304. The grid network operates in a well known manner to provide a multi-processor network.

Also illustrated in FIG. 3 are two clients, 306 and 308, which clients access web services provided via web server 300 via a network connection, such as the Internet. It is understood that the present invention is not limited to the configuration illustrated in FIG. 3 and that numerous other components, including additional clients, additional servers, and additional network connections, as well as additional other peripheral components may be included and still fall within the scope of the present invention.

Figure 4:
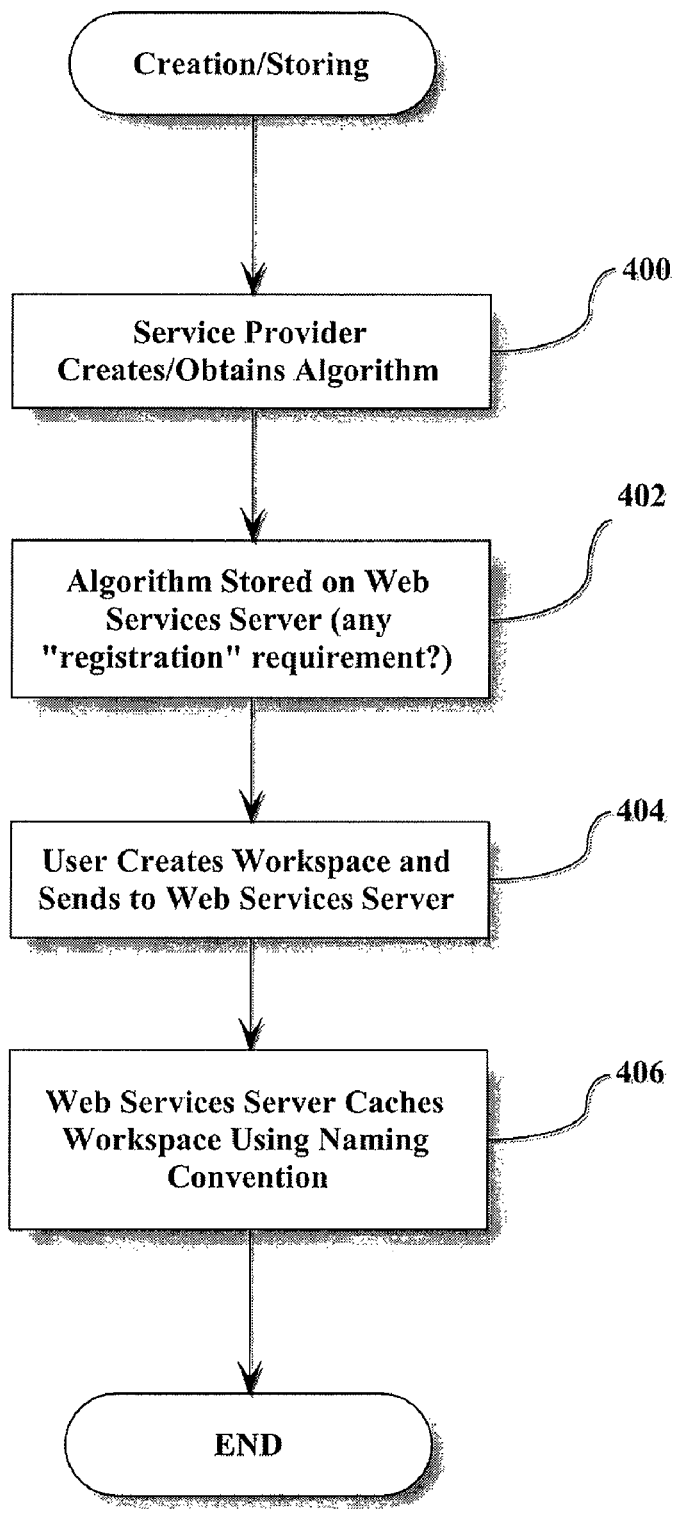
FIG. 4 is a flowchart illustrating the logical steps involves in creating and caching of models on the web service.

Referring now to the flowchart of FIG. 4, as per step 400, a developer, such as the service provider, creates and/or obtains one or more data mining algorithms and stores them on web server 300 or in a way in which they are accessible to web server 300. Any data mining algorithms may be used, including associations algorithms, logistic regression algorithms, neural network algorithms, decision tree algorithms, clustering algorithms, and RBF algorithms. It is understood that these specific algorithms are listed here for the purpose of example only, and that other data mining algorithms can also be included and fall within the scope of the present invention. Once created and/or obtained, the algorithm(s) are stored on the web service's server 300 in a known manner (step 402). This process makes the algorithms available for use by users of the web service 300, for example, by users of clients 306 and 308.

A user then creates the workspace (also known as a model) to be used in connection with the algorithm to achieve the desired data mining results (step 404). The workspace comprises essentially the model parameters pertinent to the particular algorithm with which it is to be used, and as part of the preparation of the workspace, the algorithm to be used in connection with the workspace is also identified. The model workspace is typically a result of training an algorithm on a dataset of known outcomes. Known methods can be used to implement the workspace, including PMML (Predictive Model Markup Language). The user can prepare multiple workspaces to work with the same algorithm, as well as multiple workspaces to work with different algorithms available on the web service. These workspaces are named according to a naming convention and cached (step 406) on the web service 300.

Figure 5:
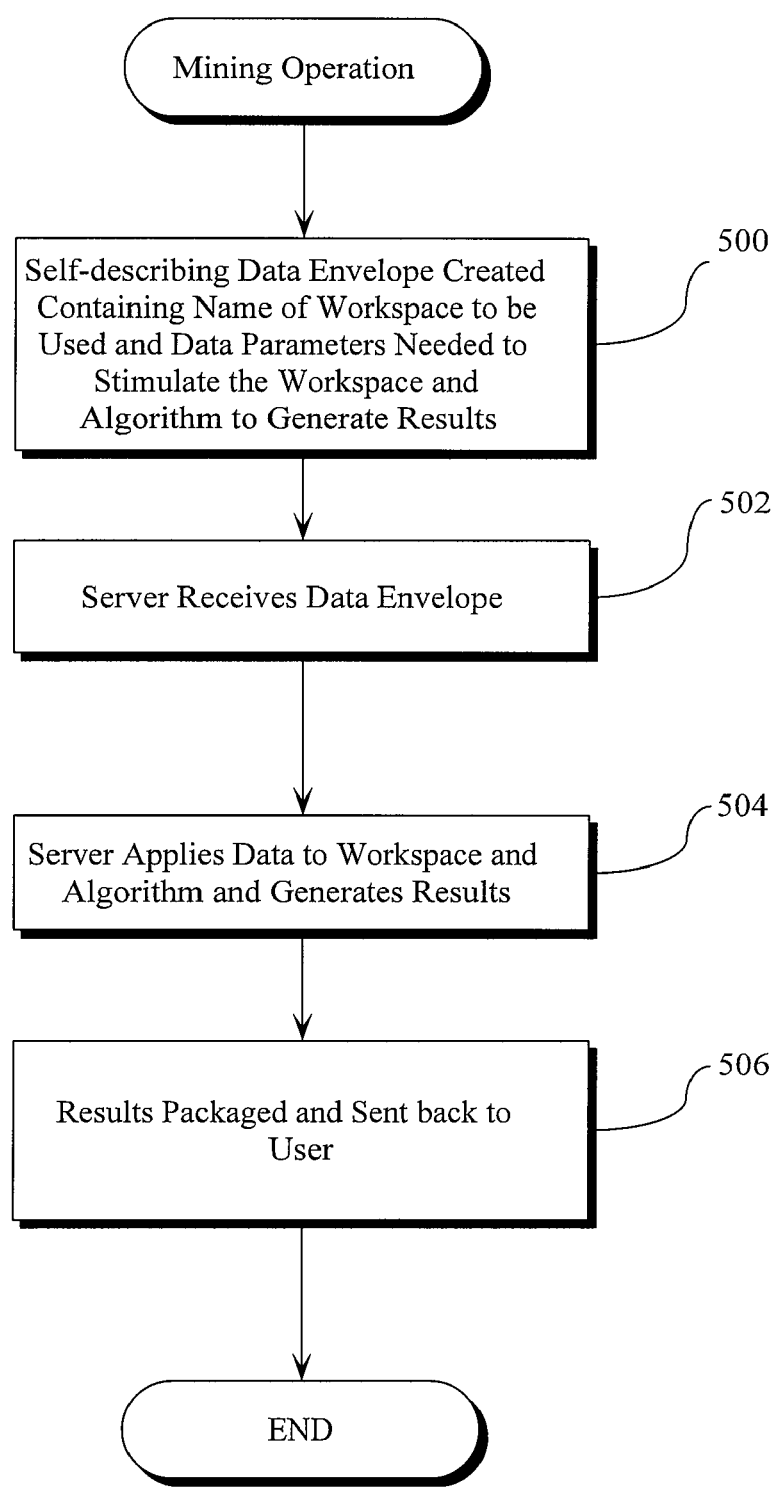
FIG. 5 is a flowchart illustrating the process involved with performing a data mining operation in accordance with the present invention.

The flowchart of FIG. 5 illustrates the logical steps involved with carrying out the data mining operations after the workspaces have been cached on the web service 300. Referring to FIG. 5, a data mining operation is initiated by the creation of a self-describing data envelope containing the name of the workspace to be used, and also containing the data parameters needed to stimulate the workspace and named algorithm to generate the results. In other words, this data envelope contains the data to be analyzed, as well as the particular workspace (which defines the algorithm to be used) to be used in conducting the data mining operations (step 500). At step 502, the web service receives the data envelope, and at step 504, the web service applies the data to the named workspace and algorithm and generates the results. At step 506, the results are packaged (e.g., in a data envelope) and sent back to the user at their client device.

The scores or other result data are then subsequently utilized to perform an action relative to the data, i.e., relative to the customer, taxpayer, etc. that the particular data represents.

As an example, a tax authority may have large volumes of data pertaining to the tax returns of individuals and businesses who are required to pay taxes within their jurisdiction. To identify, i.e., screen out, those taxpayers who are not likely to be submitting fraudulent tax returns, a workspace may be created that gathers data pertaining to the profession of the taxpayer, the taxable income over the last five years for that taxpayer, the deductions taken by that taxpayer over the last five years, the taxpayer's age, family status, and the like. This workspace is then cached on the web service under a predetermined name, and also identifies which of the data mining algorithms will be used to perform the data mining operations.

Then, when ready, the tax authority can create a data envelope identifying which workspace will be used, and provide it with the data parameters for the taxpayers of interest. To be thorough, the initial analysis would likely involve all taxpayers for a particular tax year and tax type and tax form. In addition to models predicting the probability of fraud, models predicting the taxpayer response, the amount of potential recovery or credit denial and the resource costs can be combined to determine the "next-best case" for the tax department to pursue. The data mining algorithm then processes the data in a well known manner, and comes up with listings of those taxpayers who have characteristics that indicate that their returns are likely not fraudulent. It is understood that the parameters can be adjusted so that, rather than indicating which taxpayers are not filing fraudulent returns, instead the results could generate a list of taxpayers who are likely to be filing fraudulent returns. In any event, regardless of how the analysis is conducted, the results are packaged and sent back to the user (the tax authority) where they can use the results to focus their investigation on likely suspects.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a device on which an IM client is running. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. In a computing environment, a method for performing an enhanced data mining operation over a network, said network including a web server and at least one client device, comprising the steps of:
    receiving, by said web server, of a first message from one of said client devices, said message containing data to be subjected to said data mining operation,
        wherein said first message identifies a plurality of workspaces cached on said web server to be used in connection with said data mining operation;
        wherein said plurality of workspaces cached on said web server identify one or more data mining algorithms stored on said web server to be used to perform said data mining operation and identify model parameters pertinent to said one or more identified algorithms;
    performing, by said server, of said data mining operation to produce a data mining result; and
    preparing a second message, to said one of said client devices, said second message containing said data mining result.

2. The method of claim 1, wherein said first message identifies a workspace cached on said web server to be used in connection with said data mining operation.

3. The method of claim 2, wherein said workspace cached on said web server identifies a data mining algorithm stored on said web server to be used to perform said data mining operation.

4. The method of claim 3, wherein said workspace cached on said web server identifies modeling parameters to be used by said data mining algorithm in performing said data mining operation.

5. The method of claim 4, wherein said first message comprises a self-describing data envelope.

6. A system for performing an enhanced data mining operation over a network, said network including a web server and at least one client device, said web server configured to:
    receive a first message from one of said client devices, said message containing data to be subjected to said data mining operation,
        wherein said first message identifies a plurality of workspaces cached on said web server to be used in connection with said data mining operation;

wherein said plurality of workspaces cached on said web server identify one or more data mining algorithms stored on said web server to be used to perform said data mining operation and identify model parameters pertinent to said one or more identified algorithms;

perform said data mining operation to produce a data mining result; and prepare a second message, to said one of said client devices, said second message containing said data mining result.

7. The system of claim 6, wherein said first message identifies a workspace cached on said web server to be used in connection with said data mining operation.

8. The system of claim 7, wherein said workspace cached on said web server identifies a data mining algorithm stored on said web server to be used to perform said data mining operation.

9. The system of claim 8, wherein said workspace cached on said web server identifies modeling parameters to be used by said data mining algorithm in performing said data mining operation.

10. The system of claim 9, wherein said first message comprises a self-describing data envelope.

11. Computer readable code stored on a non-transitory computer-readable medium, for performing an enhanced data mining operation over a network, said network including a web server and at least one client device, said computer-readable code comprising:

first subprocesses for receiving, by said web server, a first message from one of said client devices, said message containing data to be subjected to said data mining operation, wherein said first message identifies a plurality of workspaces cached on said web server to be used in connection with said data mining operation;

wherein said plurality of workspaces cached on said web server identify one or more data mining algorithms stored on said web server to be used to perform said data mining operation and identify model parameters pertinent to said one or more identified algorithms;

second subprocesses for performing, by said server, said data mining operation to produce a data mining result; and third subprocesses for preparing a second message, to said one of said client devices, said second message containing said data mining result.

12. The computer readable code of claim 11, wherein said first message identifies a workspace cached on said web server to be used in connection with said data mining operation.

13. The computer readable code of claim 12, wherein said workspace cached on said web server identifies a data mining algorithm stored on said web server to be used to perform said data mining operation.

14. The computer readable code of claim 13, wherein said workspace cached on said web server identifies modeling parameters to be used by said data mining algorithm in performing said data mining operation.

15. The computer readable code of claim 14, wherein said first message comprises a self-describing data envelope.

16. In a computing environment, a method for performing an enhanced data mining operation over a network, said network including a web server and at least one client device, comprising the steps of:

initiating, by one of said client devices, a first message containing data to be subjected to said data mining operation, wherein said first message identifies a plurality of workspaces cached on said web server to be used in connection with said data mining operation;

wherein said plurality of workspaces cached on said web server identify one or more data mining algorithms stored on said web server to be used to perform said data mining operation and identify model parameters pertinent to said one or more identified algorithms;

receiving, by said web server, said first message;

performing, by said web server, of said data mining operation to produce a data mining result; and preparing a second message, to said one of said client devices, said second message containing said data mining result; and sending said second message to said one of said client devices.

* * * * *